United States Patent
Shahdad et al.

(10) Patent No.: US 12,069,498 B2
(45) Date of Patent: Aug. 20, 2024

(54) GROUP MONITORING AND MANAGEMENT OF NETWORK FUNCTIONS OF PUBLIC CLOUD-BASED 5G NETWORK

(71) Applicant: DISH Wireless L.L.C., Littleton, CO (US)

(72) Inventors: Dawood Shahdad, Aurora, CO (US); Kenneth William Weber, Jr., Littleton, CO (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 18/348,434

(22) Filed: Jul. 7, 2023

(65) Prior Publication Data

US 2024/0022932 A1 Jan. 18, 2024

Related U.S. Application Data

(60) Provisional application No. 63/388,442, filed on Jul. 12, 2022.

(51) Int. Cl.
*H04L 67/1008* (2022.01)
*H04L 67/1006* (2022.01)
*H04W 24/08* (2009.01)
*H04L 67/10* (2022.01)
*H04W 84/04* (2009.01)

(52) U.S. Cl.
CPC ......... *H04W 24/08* (2013.01); *H04L 67/1006* (2013.01); *H04L 67/1008* (2013.01); *H04L 67/10* (2013.01); *H04W 84/042* (2013.01)

(58) Field of Classification Search
CPC ............ H04W 24/08; H04W 84/042; H04W 67/1006; H04W 67/1008; H04W 67/1001; H04W 67/1014; H04L 67/10
See application file for complete search history.

(56) References Cited

U.S. PATENT DOCUMENTS

| | | | | |
|---|---|---|---|---|
| 9,915,929 | B1 * | 3/2018 | Dubinsky | G05B 15/02 |
| 10,210,155 | B2 * | 2/2019 | Tajika | G06F 40/30 |
| 10,332,384 | B1 * | 6/2019 | Schryer | G06N 5/025 |

(Continued)

FOREIGN PATENT DOCUMENTS

CA 3034841 A1 * 3/2018 ............ G01S 13/91

*Primary Examiner* — Khanh Q Dinh
(74) *Attorney, Agent, or Firm* — Kilpatrick Townsend & Stockton LLP

(57) ABSTRACT

Systems and methods for group monitoring and management of network function statuses are provided. In one example, a method includes: generating a group query for statuses of a plurality of network functions of a network, in response to the group query performing group monitoring of the plurality of network functions to check the real-time status of each one of the plurality of network functions, receiving data corresponding to real-time status of each network function, comparing the data corresponding to real-time status with data corresponding to reference status for each one of the plurality of network functions, identifying presence or absence of an anomaly of each one of the plurality of network functions, based on the comparison, and generating a network function status output including data corresponding to the real-time status and an indication of the presence or absence of an anomaly for each network function.

20 Claims, 11 Drawing Sheets

(56) References Cited

U.S. PATENT DOCUMENTS

| | | | |
|---|---|---|---|
| 10,382,266 B1* | 8/2019 | Balakrishnan | H04L 67/55 |
| 10,607,480 B2* | 3/2020 | Israelsson | G08G 1/096775 |
| 10,791,445 B1* | 9/2020 | Schreib | G01S 5/0081 |
| 11,483,341 B2* | 10/2022 | Wei | H04W 12/12 |
| 2018/0300763 A1* | 10/2018 | Hoang | G06F 16/951 |
| 2020/0177473 A1* | 6/2020 | Xu | H04L 43/0894 |
| 2020/0287782 A1* | 9/2020 | Singh | H04L 41/0654 |
| 2021/0092153 A1* | 3/2021 | Wei | H04L 45/64 |
| 2021/0107535 A1* | 4/2021 | Howard | H04W 4/50 |
| 2021/0279415 A1* | 9/2021 | Ichikawa | G06F 3/04886 |
| 2021/0399894 A1* | 12/2021 | Gallagher | H04L 9/3239 |
| 2022/0239560 A1* | 7/2022 | Hao | H04L 41/0846 |
| 2022/0417768 A1* | 12/2022 | Yao | H04W 28/0268 |

* cited by examiner

| | 402 | 404 | 406 | 408 | 410 | 412 | | 414 | 416 |
|---|---|---|---|---|---|---|---|---|---|
| | NF Type | Registration Status | NF Vendor | Instance ID | Region ID | AZ ID | ... | Reference (Default) | Flag |
| 401 → | AMF | Registered | Vendor 1 | Unique ID | 1 | 1 | ... | Region 1; AZ 1 | |
| 403 → | AMF | Registered | Vendor 1 | Unique ID | 1 | 2 | ... | Region 2; AZ 2 | ! |
| | SMF | Registered | Vendor 1 | Unique ID | 1 | 3 | ... | Region 1; AZ 3 | |
| | AUSF | Registered | Vendor 1 | Unique ID | 1 | 4 | ... | Region 1; AZ 4 | ! |
| | UDM | Unregistered | Vendor 2 | Unique ID | 2 | 1 | ... | Region 2; AZ 1 | |
| | UDR | Registered | Vendor 3 | Unique ID | 2 | 2 | ... | Region 2; AZ 2 | |
| | SMSF | Registered | Vendor 3 | Unique ID | 2 | 3 | ... | Region 2; AZ 3 | |
| | BSF | Registered | Vendor 4 | Unique ID | 3 | 4 | ... | Region 3; AZ 4 | ! |
| | PCF | Registered | Vendor 4 | Unique ID | 1 | 1 | ... | Region 1; AZ 2 | |
| | CHF | Registered | Vendor 5 | Unique ID | 2 | 2 | ... | Region 2; AZ 2 | |
| | EIR | Registered | Vendor 6 | Unique ID | 2 | 3 | ... | Region 2; AZ 3 | |
| | ... | ... | ... | ... | ... | ... | ... | ... | ... |

FIG. 4

GROUP MONITORING AND MANAGEMENT OF NETWORK FUNCTIONS OF PUBLIC CLOUD-BASED 5G NETWORK

CROSS REFERENCE TO RELATED APPLICATIONS

This application claims priority to U.S. Provisional Patent Application No. 63/388,442, filed on Jul. 12, 2022, the disclosure of which is incorporated by reference in its entirety for all purposes.

BACKGROUND

The deployment of 5G (Fifth Generation) cellular networks has become increasingly prevalent as the demand for high-speed and low-latency connectivity continues to grow. An example 5G network may include a multitude of network functions distributed across various geographical areas, including core data centers, national data centers, regional data centers, edge data centers, and other regions or zones of cloud computing environments. Each network function plays a critical role in delivering seamless and reliable communication services to end-users. However, the hierarchical architecture and scale of the 5G networks present challenges in monitoring and managing the status of network functions. It is of importance to monitor and manage the status of network functions to ensure optimal network performance, identify and resolve issues promptly, and maintain service availability. 5G network operators or administrators need to check the statuses (e.g., registration status, operational status, deployment status, health status, etc.) of the network functions, identify performance degradation, detect faults, and take corrective measures to prevent service disruptions.

BRIEF SUMMARY OF THE DISCLOSURE

In accordance with some embodiments of the present disclosure, a computer-implemented method for monitoring network function status of a network is provided. In one example, a method includes: generating a group query for a plurality of network functions of a network, the group query including commands for checking real-time status of each one of the network functions, in response to the commands, performing group monitoring of the plurality of network functions to check the real-time status of each one of the plurality of network functions according to the group query, receiving data corresponding to real-time status of each network function, comparing the data corresponding to real-time status with the data corresponding to reference status for each one of the plurality of network functions, identifying presence or absence of an anomaly of each one of the plurality of network functions, based on the comparison, generating a network function status output, the network function status output including data corresponding to the real-time status and an indication of the presence or absence of an anomaly for each one of the plurality of network functions.

In some embodiments, the network is a 5G core network deployed on a cloud computing platform, the 5G core network comprises a national data center, a plurality of regional data centers, and a plurality of breakout edge data centers, the cloud computing platform comprises a plurality of cloud computing regions, each cloud computing region further comprises a plurality of cloud computing sub-regions, and each cloud computing sub-region further comprises a plurality of local zones, the national data center is established across the plurality of cloud computing regions, the plurality of regional data centers are respectively established on the plurality of cloud computing regions, and the plurality of breakout edge data centers are respectively established on the plurality of local zones.

In accordance with some embodiments of the present disclosure, a system for network function status monitoring and management is provided. In one example, the system includes one or more processors; and a computer-readable storage media storing computer-executable instructions that, when executed by the one or more processors, cause the system to: generate a group query for a plurality of network functions of a network, the group query including commands for checking real-time status of each one of the network functions, in response to the commands, perform group monitoring of the plurality of network functions to check the real-time status of each one of the plurality of network functions according to the group query, receive the data corresponding to real-time status of each network function, compare the data corresponding to real-time status with the data corresponding to reference status for each one of the plurality of network functions, identify presence or absence of an anomaly of each one of the plurality of network functions, based on the comparison, and generate a network function status output, the network function status output including data corresponding to the real-time status and an indication of the presence or absence of an anomaly for each one of the plurality of network functions.

In accordance with some embodiments, the present disclosure also provides a non-transitory machine-readable storage medium encoded with instructions, the instructions executable to cause one or more electronic processors of a system to perform operations of a method or a process described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 is a schematic diagram illustrating an example of a network function status output according to various embodiments.

DETAILED DESCRIPTION

Overview

Figure 1A:
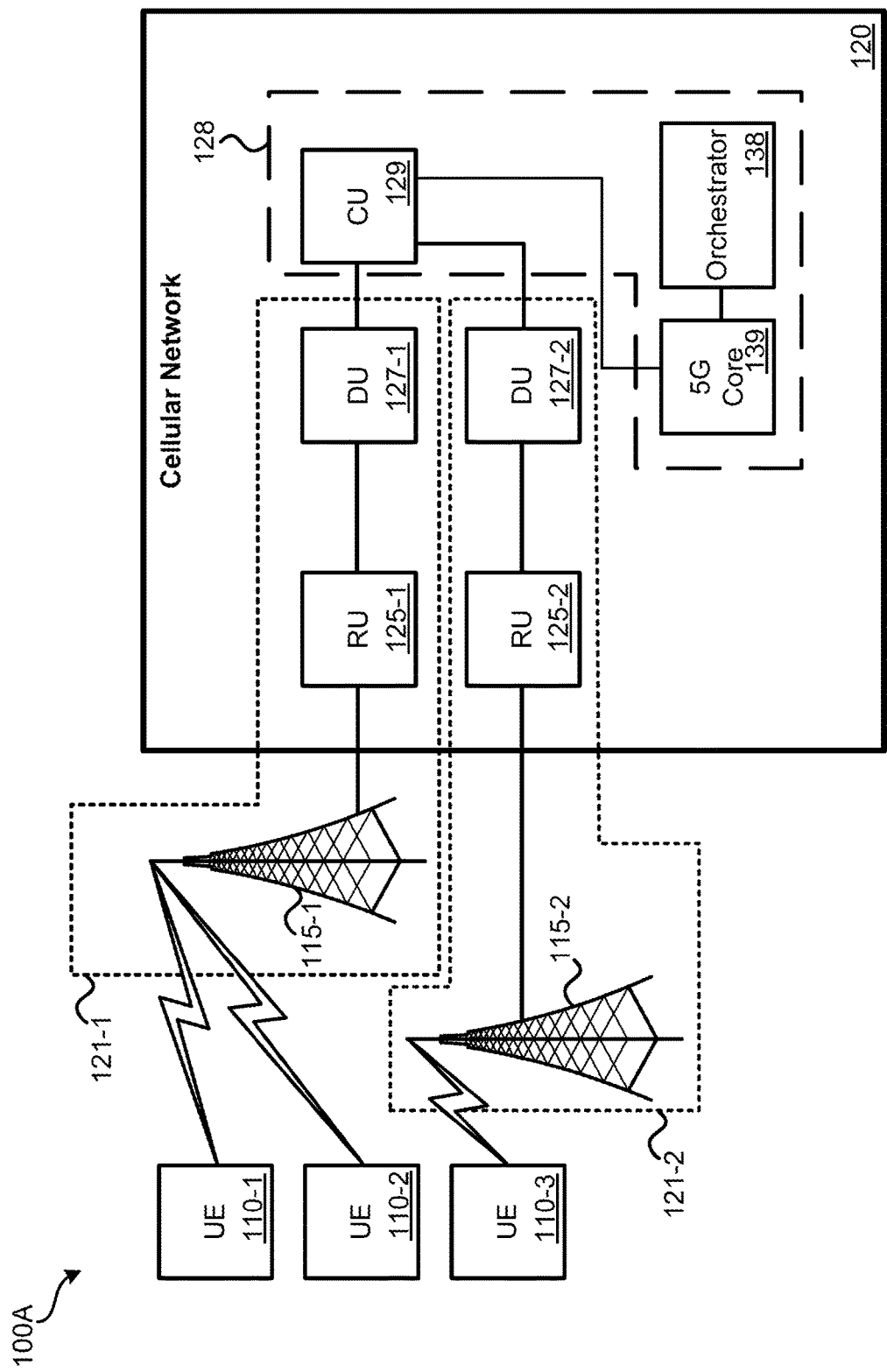
FIG. 1A is a schematic diagram illustrating one example architecture of a 5G network system according to various embodiments.

Traditionally, monitoring the statuses of network functions (also referred to as and used interchangeably with "NFs") in a 5G network environment has been a time-consuming and inefficient process. Network operators are required to check the status of each network function individually, one by one, which is not only labor-intensive but also prone to errors. This approach also lacks a holistic view of the network function statuses and performance, as the network operator can only gather fragmented information from isolated checks. The individual checking approach also makes it challenging to identify system-wide issues, trends, or patterns that may impact the overall network performance across geographic areas. Furthermore, the lack of real-time visibility into the interconnected network functions hinders timely fault detection, diagnosis, and resolution. This fragmented approach to monitoring not only leads to increased operational complexity but also restricts the network operator's ability to proactively manage and optimize the network functions.

The present disclosure provides techniques to address the above-mentioned challenges. According to some embodiments, the present disclosure provides a more streamlined and comprehensive monitoring solution that provides a more unified view of the network function statuses, enabling network operators to identify and address issues efficiently, improve performance, and deliver superior quality of network services to end-users.

One insight provided in the present disclosure is related to group monitoring of network function statuses of a 5G network. Group monitoring may provide at least one of the following advantages over the traditional fragmented approach. First, group monitoring provides a comprehensive and centralized view of the network function statuses, allowing the network operator to simultaneously monitor all network functions across the 5G network or a selected portion of network functions in a certain region of the 5G network. This holistic perspective enables quicker identification of system-wide issues, trends, or patterns that may impact overall network performance. Second, group monitoring improves operational efficiency by reducing manual efforts and streamlining the monitoring process. Instead of checking each function individually, operators can assess the collective status of functions in a single glance, saving time and resources. Additionally, group monitoring facilitates proactive management and fault detection, as the network operator can promptly identify and address issues affecting multiple network functions, thereby enhancing network stability as well as service availability.

Another insight provided in the present disclosure is related to a centralized database of network function registration status. The centralized database may be used to facilitate group monitoring of the network functions of a 5G network. By centralizing the registration status information of network functions, the network operator can establish a reliable and up-to-date repository of the operational states of all network functions across the 5G network. This database serves as a point of reference for group monitoring, enabling the network operator to compare the current status of each network function with the expected or desired state. Group comparison allows for efficient identification of discrepancies, anomalies, or non-compliant functions, as any deviations from the reference database can be easily identified and flagged. A combination of the centralized database and the group monitoring rapid may significantly improve the overall efficiency of network function troubleshooting and remediation.

Example System, Devices, and Methods

The virtualization of cellular network components, such as in 5G New Radio (NR) cellular networks can allow for at least some cellular network components to be implemented on a cloud computing platform. Therefore, rather than having special-purpose hardware operated by a cellular network provider, special-purpose software can be executed on a cloud computing platform to perform the function of the cellular network component, such as a function within the cellular network core or a component of the radio access network (RAN), such as a centralized unit (CU).

Implementing components of a cellular network using a cloud computing platform can have significant advantages. The cloud computing platform can have a large amount of computing and storage capability such that when additional processing capabilities, storage capabilities, or both are needed by the cellular network, they can be readily provisioned. For example, if demand requires an adjustment to the cellular network, such as the addition of another CU, no physical changes may be needed, rather a new CU instantiation can be created on the cloud computing network and, following configuration, can begin functioning as part of the cellular network almost immediately.

A cellular network that is executed on the cloud results in many instantiations of the same function servicing different portions of the cellular network or serving as a back-up in case of failure. For example, hundreds of instantiations of CUs may be executed across different cloud computing instances and cloud computing data centers of the cloud computing network to serve different distributed units (DUs) of the cellular network. Similarly, within the core of the cellular network, a particular function or pod of a function may be instantiated many times over, such as to handle the processing load being placed on the cellular network.

Further detail regarding such embodiments and other embodiments is provided in relation to the figures. FIG. 1A illustrates an embodiment of a cellular network system 100A (hereinafter "system 100A"). FIG. 1A represents an embodiment of a cellular network which can accommodate the cloud-based architecture of FIG. 2A. System 100A can include a 5G New Radio (NR) cellular network; other types of cellular networks, such as 6G, 76, etc. may also be possible. System 100A can include: UE 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on the location of individual UEs, UE 110 may use RF to communicate with various base stations of cellular network 120. As illustrated, two base stations are illustrated: base station equipment 121 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other man-made or natural structure to which one or more antennas can reasonably be mounted to provide cellular coverage to a geographic area. Similarly, base station 121-2 can include: structure 115-2, RU 125-2, and DU 127-2.

Real-world implementations of system 100A can include many (e.g., thousands) of base stations and many CUs and 5G core 139. Base station 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized O-RAN implementation, CU 129, 5G core 139, and/or orchestrator 138 can be implemented virtually as software being executed by general-purpose computing equipment, such as in a data center of a cloud computing platform, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100A, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator (or orchestration platform) 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 1B:
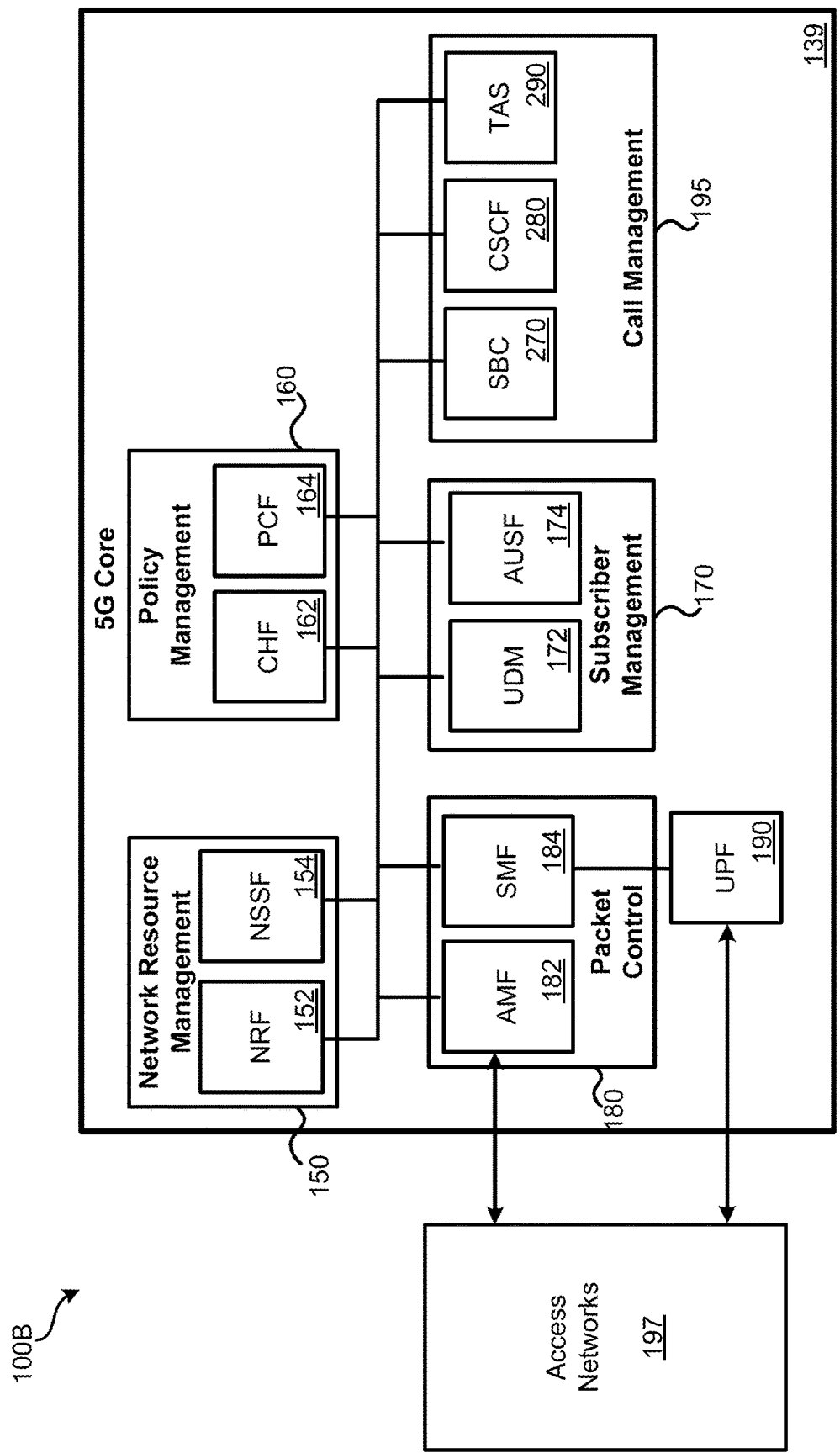
FIG. 1B is a schematic diagram illustrating one example architecture of a 5G core of the cellular network system of FIG. 1A according to various embodiments.

Further detail regarding native 5G Core 139 is provided in relation to embodiment 100B of FIG. 1B. 5G core 139, which can be physically distributed across data centers or located at a central national data center (NDC), can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

As shown in FIG. 1, 5G core 139 resides on a cloud computing platform. While from a client's or user's point of view, the "cloud" can be envisioned as an ephemeral computing workspace that occupies no physical space, in reality, a cloud computing platform is an interconnected group of data centers throughout which computing and storage resources are spread. Therefore, data centers may be scattered geographically and can provide redundancy.

Figure 2A:
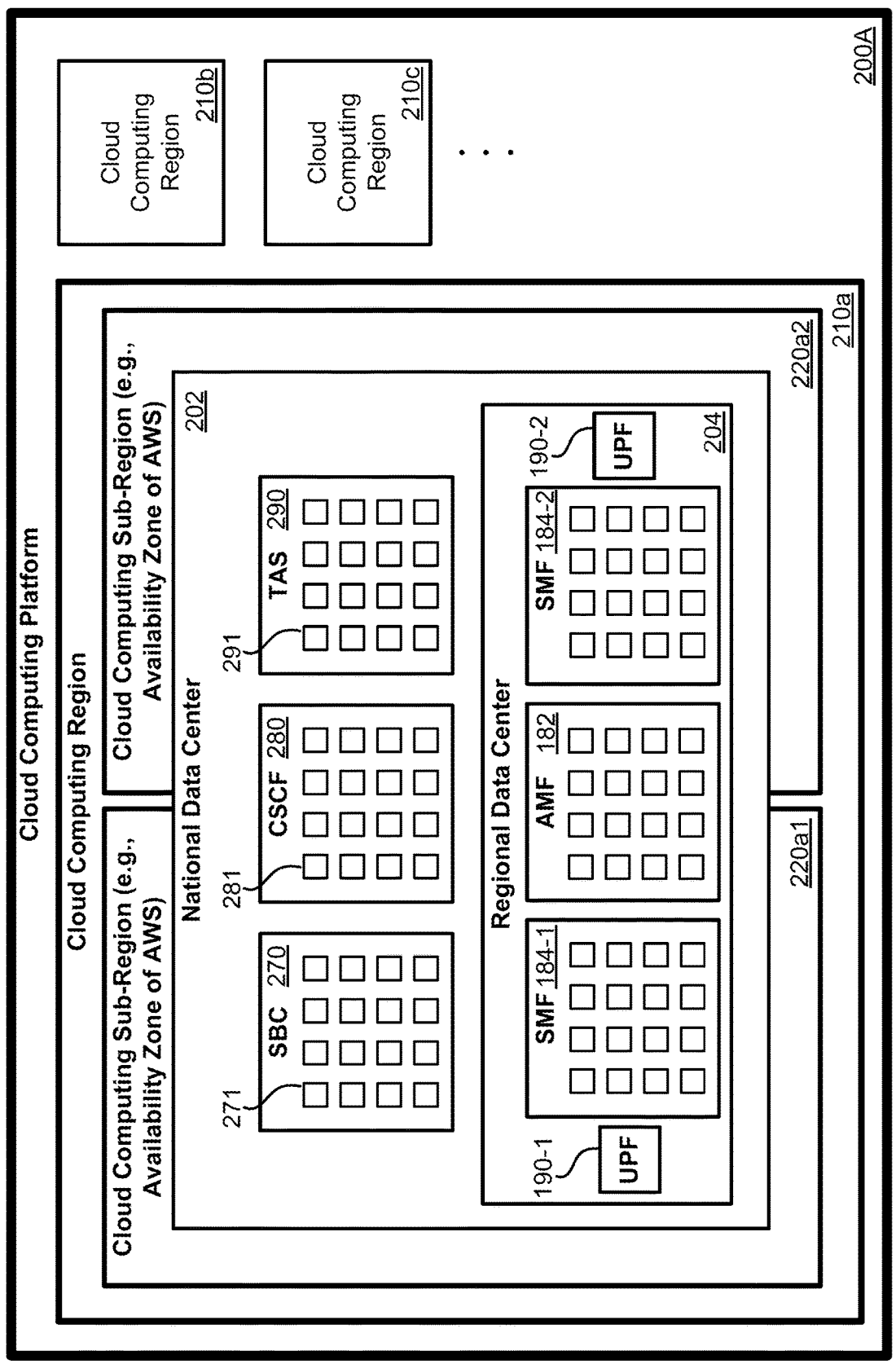
FIG. 2A illustrates one example of a 5G core network topology on a cloud computing platform.

FIG. 2A is a schematic diagram illustrating an example of a layout (topology) of a 5G network topology on cloud computing platform 200A. Examples of the cloud computing platform include but are not limited to Amazon Web Services (AWS), Microsoft Azure, Google Cloud Platform (GCP), IBM Cloud, Oracle Cloud Infrastructure (OCI), etc. Cloud computing platform 200A can be logically and physically divided up into various different cloud computing regions 210 (e.g., a first cloud computing region 210*a*, a second cloud computing region 210*b*, a third cloud computing region 210*c*, . . . etc.). For the purpose of simplicity, the cloud computing region is used interchangeably with "region." Each of cloud computing regions 210 can be isolated from other cloud computing regions to help provide fault tolerance and stability. Further, each of cloud computing regions 210 may provide superior service to a particular geographic region based on physical proximity. For example, cloud computing region 210*a* may have its datacenters and hardware located in the northeast of the United States while cloud computing region may have its datacenters and hardware located in California. For simplicity, the details of the cellular network as executed in only cloud computing region 210a is illustrated. Similar components may be executed in other cloud computing regions of cloud computing regions 210 (210b, 210c, . . . etc.).

Each of cloud computing regions 210 may include two or more cloud computing sub-regions 220 (e.g., 220a1, 220a2, . . . etc.). Each of cloud computing subregions 200 can allow for redundancy that allows for fail-over protection. Such as, if a particular cloud computing sub-region experiences an outage, another cloud computing sub-region within the same cloud computing region can continue functioning and providing service. If the cloud computing platform used is AWS platform, cloud computing sub-regions may be also referred to as and used interchangeably with "sub-region," "availability zones," or "AZ." For example, a database that is maintained as part of NDC 202 may be established across the cloud computing sub-regions or replicated in each cloud computing sub-region; therefore, if one of cloud computing sub-regions 220 fail, a copy of the database remains up-to-date and available, thus allowing for continuous or near continuous functionality.

In the topology of a 5G NR cellular network, 5G core functions of 5G core 139 can logically reside as part of a national data center (NDC). NDC 202 can be understood as having its functionality existing in multiple (e.g., two, three, or more) cloud computing sub-regions 220 within cloud computing region 210a. This arrangement allows for load-balancing, redundancy, and fail-over. Within NDC 202, multiple regional data centers (RDCs) can be logically present, of which a single RDC is illustrated as RDC 204. Each of such one or more regional data centers may execute 5G core functions for a different geographic region or group of RAN components. As an example of 5G core components that can be executed within an RDC, such as RDC 204, may be: UPFs 190, SMFs 184, and AMFs 182. While instances of UPFs 190 and SMFs 184 may be executed on one of cloud computing sub-regions 220, SMFs 184 may be executed across multiple cloud computing sub-regions 220 for redundancy, processing load-balancing, and fail-over.

Each network function may include multiple pods. A "pod" refers to a software sub-component of the network function. For simplicity of FIG. 2A, each of SMFs 184 and AMF 182 are shown as including sixteen pods each. This number is merely an example; fewer or greater numbers of pods may be part of the respective 5G core functions. Further, due to space concerns in FIG. 2A, no pods are illustrated as part of UPFs 190; UPFs may also include some number of pods that function together to perform the functions of UPF. While three exemplary network functions are illustrated as part of 5G core 139, as indicated in FIG. 1B, various other network functions can additionally or alternatively be present.

Various NFs may be present within NDC 202 but not part of an RDC, such as RDC 204. For example, one or more instances of SBC 270, CSCF 280, and TAS (telephony application server) 290 can reside with NDC 202, but are not part of an RDC 204. Each of these NFs, can include one or more pods. By way of example only, sixteen pods are illustrated as part of each of SBC 270, CSCF, 280, and TAS 290; fewer or greater numbers of pods may be present in other embodiments. Pod 271 is part of SBC 270; pod 281 is part of CSCF 280; and pod 291 is part of TAS 290. Additional examples of NFs included in a 5G network are described below with references to FIGS. 2C-2D.

On a cloud computing platform, processing capabilities can be divided up into virtualized processing instances. Each processing instance may be allocated up to a fixed amount of processing resources. Therefore, a processing instance can be thought of as a physical processor that has a maximum limit on the amount of processing it can perform over a given time. One or more pods of a network function may be executed on a processing instance of the cloud computing platform. For example, various pods of SBC 270, such as pod 271, can be executed by different processing instances of the cloud computing platform.

Figure 2B:
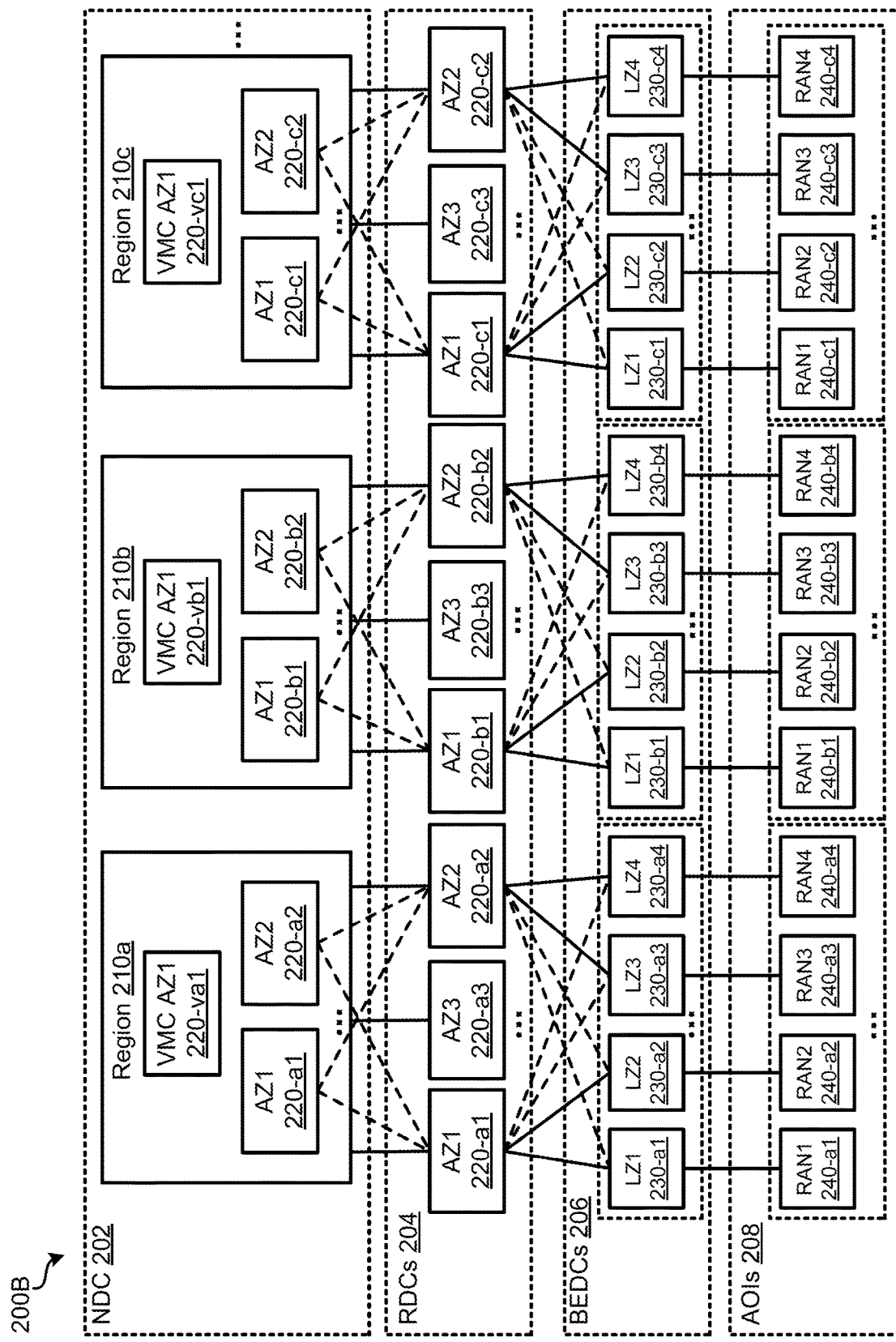
FIG. 2B is a schematic diagram illustrating an example of a 5G core network topology deployed on an Amazon Web Service (AWS) cloud computing platform.

FIG. 2B is a schematic diagram illustrating an example of a 5G core network topology 200B deployed on an AWS cloud computing platform (hereinafter 5G network 200B). It should be noted that the 5G network 200B may also be understandable as a 5G network architecture or a 5G network environment. An architecture of a cloud-based wireless network such as the 5G network 200B leverages the distributed nature of wireless cloud-native network functions and cloud flexibility, which optimizes the placement of wireless network functions for optimal performance based on latency, throughput and processing requirements.

In the illustrated example, the 5G network 200B utilizes a logical hierarchical architecture comprising an NDC 202, multiple RDCs 204, and multiple BEDCs 206 (Breakout Edge Data Centers) to accommodate the distributed nature of NFs and the varying requirements for service layer integration. The NDC 202 is established across multiple cloud computing regions 210 (hereinafter "regions 210"). For example, the NDC 202 is established across a first region 210a, a second region 210b, and a third region 210c, in a similar manner as the 5G network shown in FIG. 2A. Multiple AZs 220 may reside in each region 210. For example, a VMware cloud AZ (VMC-AZ) 220-va1, an AZ 220-a1, and an AZ 220-a2 may reside in the region 210a. The VMC-AZ 220-va1 refers a construct specific to VMware's deployment within AWS, where the VMware Software-Defined Data Center (SDDC) is distributed and replicated across multiple AZs. AZs 220-a1 and 220-a2 may be isolated data centers within the region 210a and are designed to be independent in terms of power, cooling, and networking infrastructure. AZs 220-a1 and 220-a2 may provide high availability and fault tolerance for AWS services and resources. The regions 210b and 210c may have the same or similar configuration as the region 210a.

The multiple RDCs 204 may be deployed in multiple AZs 220 across the multiple regions 210. The multiple BEDCs 206 may be deployed in cloud Local Zones (LZs) 230 hosting NFs that have strict latency budgets. The LZ can be also viewed as a portion or sub-division of the AZ. In AWS, a LZ is an extension of a region that provides low-latency access to AWS services and resources in geographical proximity to specific areas (e.g., metropolitan areas) within the region. Each LZ is designed to support workloads that require low latency (e.g., single-digit or double-digit millisecond latency) for applications and services. LZs 230 are connected with Passthrough Edge Data Centers (PEDCs), which serve as an aggregation point for all Local Data Centers (LDCs) and cell sites in a particular market. BEDCs 206 also provide internet peering for general wireless data service and enterprise customer-specific private network service. In the illustrated example, four LZs (e.g., 230-a1, 230-a2, 230-a3, and 230-a4) reside in one region (e.g., region 210a). Each LZ is further connected to a particular RAN 240 (e.g., a base station equipment 121 of FIG. 1A). Each RAN 240 (e.g., RAN 240-a1, 240-a2, etc.) may serve a particular area of interest (AOI) 208. An AOI 208 refers to a specific geographic area within the LZ 230 where there is a demand for wireless network coverage and services. An AOI could be a densely populated city, a suburban neighborhood, a shopping mall, a stadium, or any other location where users require connectivity.

In some embodiments, a deployment of a 5G network using O-RAN standards is provided. The RAN 240 may be an O-RAN network comprising an RU and a DU. These units interface with the CU, which is hosted in the BEDC 206 at a particular LZ 230. These combined pieces provide a full RAN solution that handles all radio level control and subscriber data traffic. In those embodiments, co-located in the BEDC 206 is the UPF, which anchors user data sessions and routes to the internet. The BEDCs 206 leverage local internet access available in LZs 230, which allows for a better user experience while optimizing network traffic utilization. This type of edge capability also enables enterprise customers and end-users (gamers, streaming media and other applications) to take full advantage of 5G speeds with minimal latency.

In some embodiments, RDCs 204 are hosted in a region 210 across multiple AZs 220. They host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, three RDCs may be deployed in a region, each in a separate AZ to ensure application resiliency and high availability. An AZ 220 is one or more discrete data centers with redundant power, networking and connectivity in a particular region 210. All AZs 220 in the region 210 are interconnected with high-bandwidth and low-latency networking over a fully redundant, dedicated metro fiber, which provides high-throughput, low-latency networking between AZs 220 in that region 210. Containerized network functions (CNFs) may be deployed in the RDC 204 and utilize an AWS high speed backbone to failover between AZs 220 for application resiliency. CNFs like AMF and SMF, which are deployed in RDC 204, continue to be accessible from the BEDC 206 in the LZs 230 in case of an AZ failure. CNFs may also serve as the backup CNF in the neighboring AZ and would take over and service the requests from the BEDC 206.

In some embodiments, NDCs 202 host a nationwide global service such as subscriber database, IMS (IP multimedia subsystem: voice call), OSS (Operating Support System) and BSS (Billing Support System). An NDC 202 may be hosted in the a region 210 and spans multiple AZs 220 across the AZs 220 for high availability. For example, to meet geographical diversity requirements, NDCs 202 are mapped to regions 210 where three NDCs are built in three U.S. regions (us-west-2, us-east-1, and us-east2). Regions us-east-1 and us-east-2 are within 15 ms latency budget, while us-east-1 to us-west-2 is within 75 ms latency budget.

As can be seen in FIGS. 2A-2B, when a significant number of RDCs, NDCs, BEDCs, cloud computing regions, cloud computing sub-regions, cloud computing local zones are considered as part of cloud computing platform 200A, the number of network functions executed across different NDC, RDC, and BEDC instances on cloud computing platform 200A/200B can be high. A network operator or administrator attempting to monitor the statuses, states, and health of such a cloud-based cellular network may have a significant amount of "drilling" and querying to do. Drilling refers to locating the instance of a network function that is desired to be queried. For example, a network operator may desire to perform various status checks on a particular network function of a particular pod thereof that operates in a particular cloud computing sub-region.

Figure 2C:
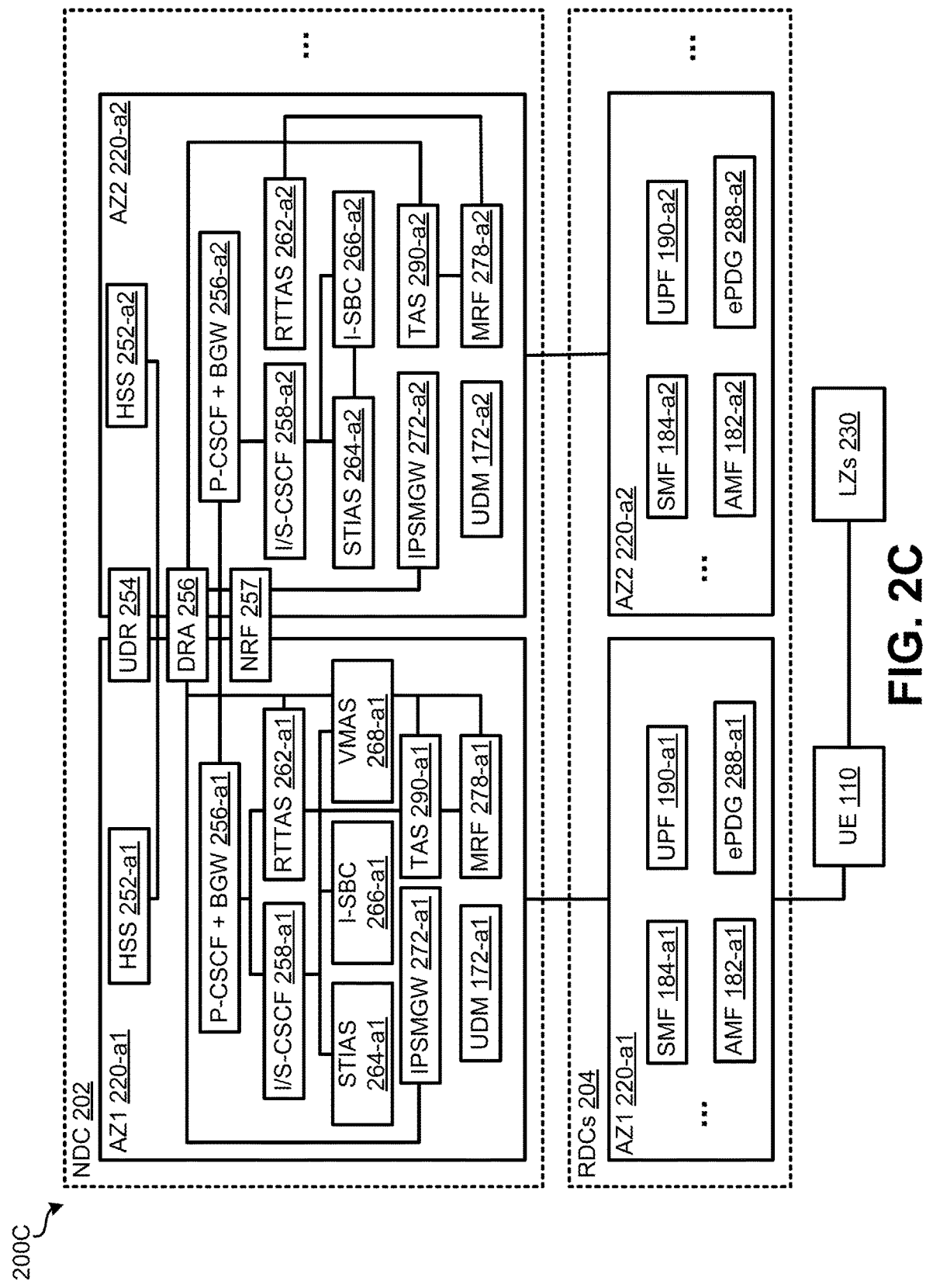
FIG. 2C is a schematic diagram illustrating another example of a 5G network system deployed on an AWS cloud computing platform.

FIG. 2C is a schematic diagram illustrating another example of a 5G network topology 200C deployed on an AWS cloud computing platform (hereinafter 5G network 200C). In the illustrated example, the NDC 202 is deployed in a region (not shown) and across two AZs (e.g., AZ1 220-*a*1 and AZ2 202-*a*2 in the region. One or more RDCs 204 are deployed across the AZs 220-*a*1 and 202-*a*2. UE 110 from a LZ 230 may be connected to the AZ 220 associated with the LZ 230 to receive 5G network services. Multiple NFs can be executed on the NDC 202 and the RDCs 204. As mentioned above, the NFs executed on the NDC 202 and the RDCs 204 may be different.

In some embodiments, multiple NFs are executed on the NDC 202 in each AZ (220-*a*1 and 220-*a*2). For example, AZ1 220-*a*1 may include various NFs executed on the NDC 202, such as Home Subscriber Server (HSS) 252-*a*1, Proxy-CSCF/Boarder Gateway (P-CSCF/BGW) 256-*a*1, Interrogating/Serving-CSCF (I/S-CSCF) 258-*a*1, Real-Time Task Allocation and Scheduling (RTTAS) 262-*a*1, Secure Traffic Integrity Assurance server (STIAS) 264-*a*1, Integrated Session Border Controller (I-SBC) 266-*a*1, Virtualized Mobile Access server (VMAS) 268-*a*1, IP Session Management Gateway (IPSMGW) 272-*a*1, Telephony Application Server (TAS) 290-*a*1, UDM 172-*a*1, Media Resource Function (MRF) 278-*a*1, among others. AZ2 220-*a*2 may include similar NFs executed on the NDC 202 as AZ1 220-*a*1. The 5G network 200C may further include data repositories shared by the multiple AZs such that NFs executed on the NDC 202 across the multiple AZs 220-*a*1 and 220-*a*2 may access to the data repositories. An example of the data repository is a Unified Data Repository (UDR) 254. The 5G network 200C may further include a Diameter Routing Agent (DRA) 256 and a Network Repository Function (NRF) 257. The 5G network 200C may further include additional network elements and network functions such as PCF, BSF (Bootstrapping Server Function), CHF, SMSC, etc.

In some embodiments, multiple NFs are executed on the RDC 204 in each AZ (220-*a*1 and 220-*a*2). For example, AZ1 220-*a*1 may include various NFs executed on the RDC 204, such as SMF 184-*a*1, AMF 182-*a*1, UPF 190-*a*1, and evolved Packet Data Gateway (ePDG) 288-*a*1. AZ2 220-*a*2 may include similar NFs executed on the RDC 204 as AZ1 220-*a*1.

Figure 2D:
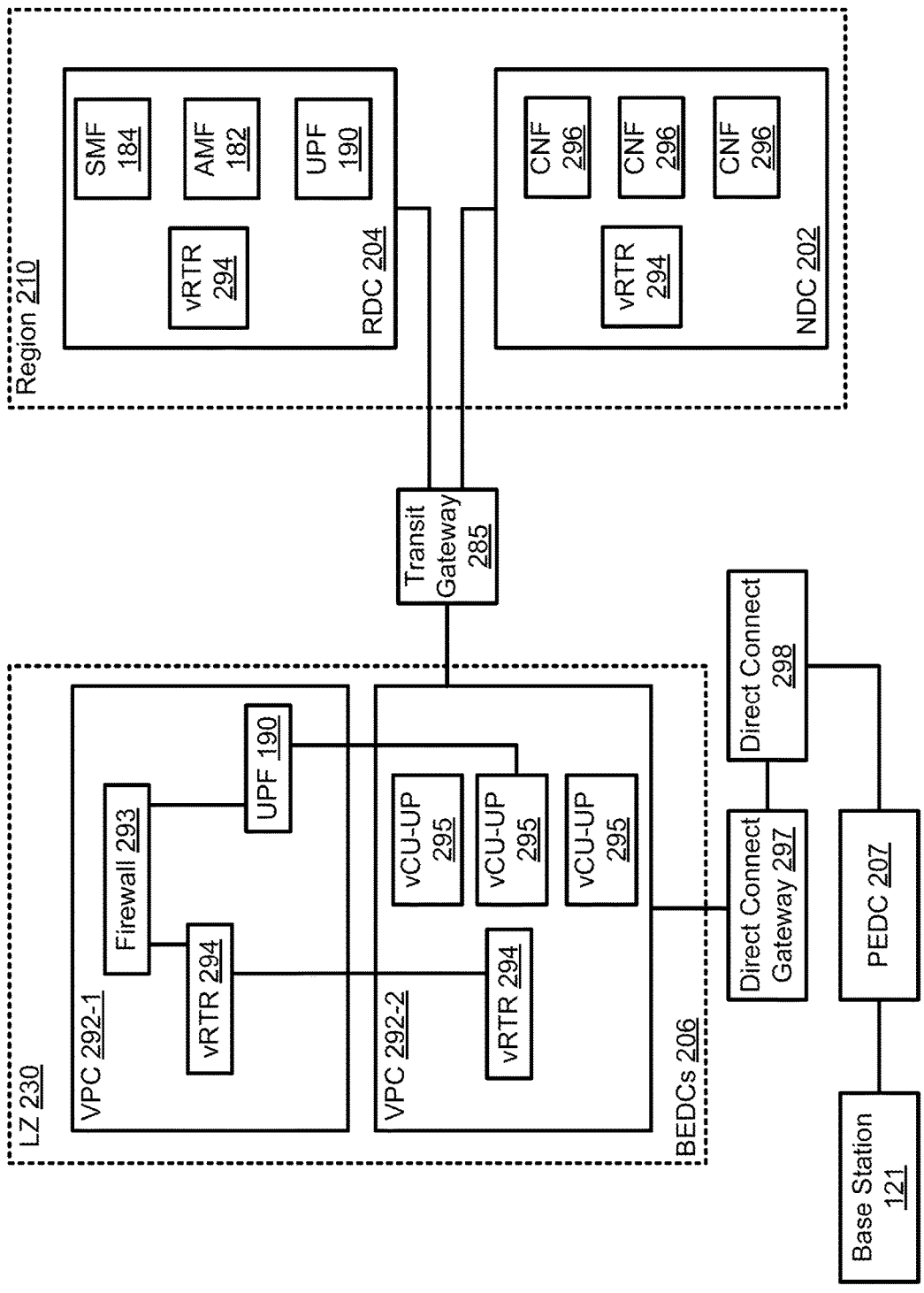
FIG. 2D is a schematic diagram illustrating another example of a 5G network system deployed on an AWS cloud computing platform.

FIG. 2D is a schematic diagram illustrating another example of a 5G network topology 200D deployed on an AWS cloud computing platform (hereinafter 5G network 200D). In the illustrated example, the 5G network 200D utilizes Amazon Virtual Private Cloud (Amazon VPC or VPC) to represent NDCs, RDCs, BEDCs, and Pass-through Edge Data Centers (PEDCs). Various CNFs 296 as well as virtual routers (vRTRs) 294 may be executed on the NDC 202 in a particular region 210. Various NFs including SMF 184, AMF 182, UPF 190 may be executed on the RDC 204 in the same region 210. The RDC 204 and NDC 202 are both connected to the LZ 230 via the Transit Gateway 285. Multiple VPCs 292 may be deployed on the BEDC 206 in a LZ 230 connected to the region 210. Various NFs may be executed on each of the VPCs 292. For example, firewall 293, UPF 190, and one or more vRTRs 294 may be executed on VPC 292-1; while one or more Virtual Central Unit-User Planes (vCU-UPs) 295 as well as one or more vRTRs 294 may be executed in VPC 292-2. The LZ 230 is connected to Direct Connect (DX) 298 via Direct Connect Gateway (DGW) 297. The DX 298 is further connected to the base station equipment 121 (i.e., the RAN) via PEDC 207.

The VPC 292 can facilitate launching CNF resources on the virtualized 5G network 200D. The VPCs 292 hosting each of the data centers are fully interconnected utilizing AWS global network and the TGW 285. The TGW 285 is used to provide connectivity between VPCs 292 deployed in the NDCs, RDCs, and BEDCs with scalability and resilience.

In some embodiments, each region 210 hosts at least one NDC 202 and at least one RDC 204. NDC 202 functions to communicate to each other through the TGW 285, where each VPC 292 has an attachment to the specific regional TGW 285. Provisioning of TGW 285 and other required attachments are automated using CI/CD pipelines with Application Programing Interfaces (APIs). Gateway routing tables may be utilized to maintain isolation of traffic between functions.

In one example implementation, some of the 5G core NFs use support for advanced routing capabilities inside VPC and across VPCs (e.g., UPF 190, SMF 184 and ePDG 288). These NFs respond to routing protocols such as BGP (Boarder Gateway Protocol) for route exchange and fast failover (both stateful and stateless). To support these requirements, vRTRs 294 are deployed to provide connectivity within and across VPCs 292, as well as back to the on-premises network.

In some embodiments, a traffic from vRTRs 294 may be encapsulated using Generic Routing Encapsulation (GRE) tunnels, creating an "overlay network." This leverages the underlay network for end-point reachability. The overlay network may use Intermediate Systems to Intermediate Systems (IS-IS) routing protocol in conjunction with Segment Routing Multi-Protocol Label Switching (SR-MPLS) to distribute routing information and establish network reachability between the vRTRs 294. Multi-Protocol Border Gateway Protocol (MP-BGP) over GRE may be used to provide reachability from on-premises network to the overlay network and reachability between different regions. The combined solution provides network operators the ability to honor requirements such as traffic isolation and efficiently route traffic between on-premise network, cloud-based network, and third parties (e.g., voice aggregators, regulatory entities etc.).

In one embodiment, DX 298 provides connectivity from base station equipment 121 to the LZ 230 where cell sites are homed. Cell sites are mapped to a particular LZ based on proximity to meet 5G RAN mid-haul latency expected between DU and CU. The DX for RAN Mid-Haul DX is leveraged to provide connectivity between RAN and the cloud. Each LZ 230 is connected over 2*100G DX links for redundancy. DX in combination with LZ may provide a sub 10 msec Mid-haul connectivity between on-premises RAN (i.e., base station equipment 121) and BEDC. End-to-end SR-MPLS provides connectivity from cell sites to LZ 230 and region 210 via overlay network using the vRTRs 294. Through this, multiple Virtual Routing and Forwarding (VRF) from RAN to the cloud can be extended.

Figure 3:
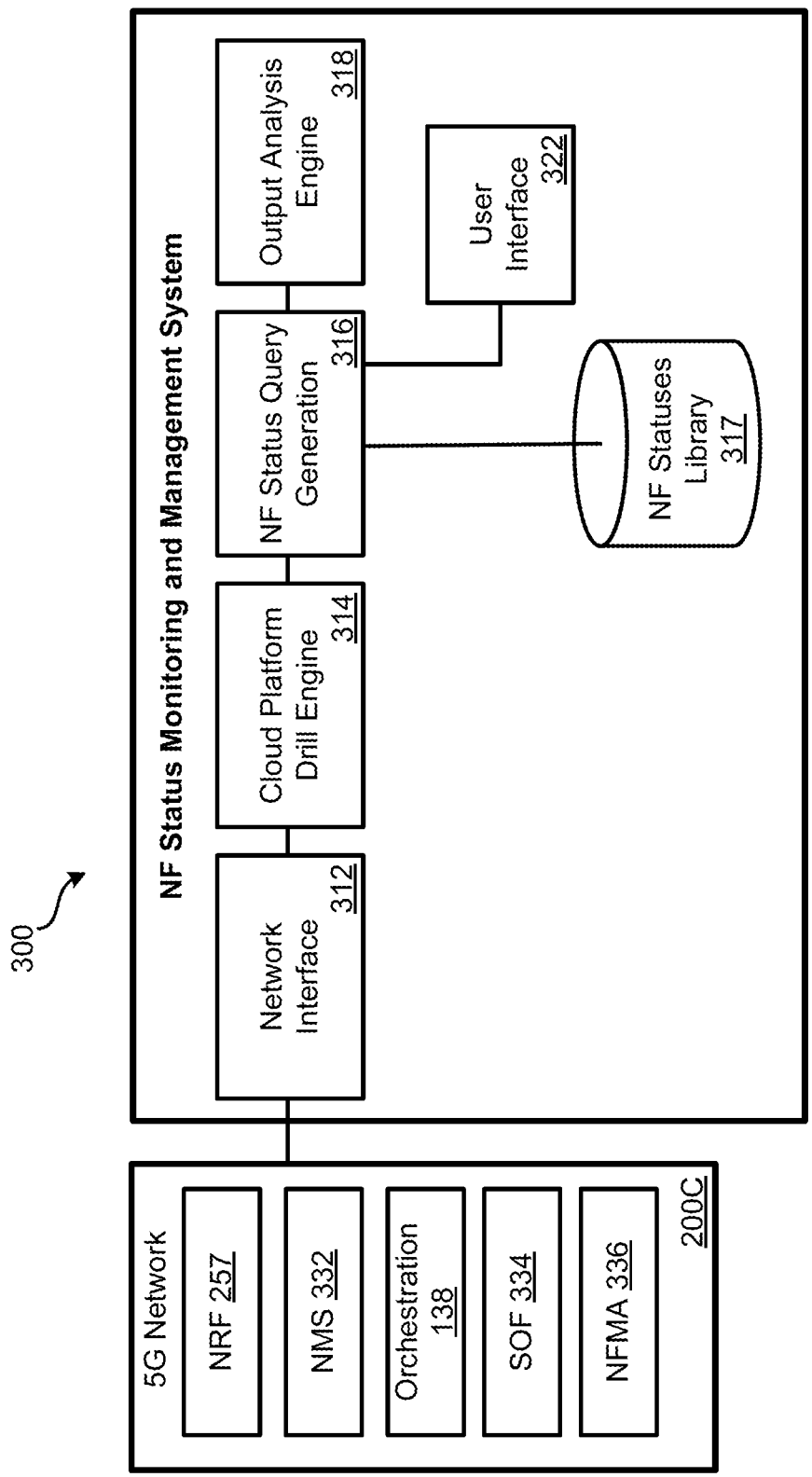
FIG. 3 is a schematic diagram illustrating an example system 300 for monitoring and management of network function status of a 5G network according to various embodiments.

FIG. 3 is a schematic diagram illustrating an example system 300 for monitoring and management of NF status of a 5G network (herein after "network function status monitoring and management system 300" or "system 300") according to various embodiments. In the illustrated example, the system 300 includes, among other components, a network interface 312, a cloud platform drill engine 314, a network function statues query generation engine 316, an output analysis engine 318, a network function statuses library 317, and a user interface 322. The system 300 is in communication with a 5G network described herein (e.g., the 5G network 200C of FIG. 2C). Each of such components can be implemented as special-purpose software that executes on the cloud computing platform or on a computer system that is in communication with the cloud computing platform 200A of FIG. 2A. In some embodiments, system 300 may be executed on the cloud computing platform 200A across multiple regions 210 thereof. In some embodiments, system 300 may be executed within one of the regions 210 on which NDC 202 resides.

User interface 322 can allow a user to interact with system 300. In some embodiments, user interface 322 can be a command line interface. In other embodiments, a graphical user interface (GUI) may be present. User interface 322 can allow a network operator or administrator to specify various parameters of the NF status monitoring process to be performed. User interface 322 can be used to specify: 1) the cloud computing region or cloud computing sub-region or local zone in which the network operator desires to perform the NF status monitoring process; 2) the NF(s) to be monitored; and/or 3) the source or destination of messages being received by or sent by the NF(s). The network operator does not need to know the specific names of the network functions, number of instances of the NF or the NF's pods, or other details of the NFs within the cloud computing region or sub-region or local zone.

The cloud platform drill engine 314 may be used to identify instances of the NFs being executed on the cloud computing platform and/or the pods of such NFs. Via user interface 322, a network operator can specify the cloud computing region or sub-region or local zone in which the NF monitoring process is to be performed. In response, the cloud platform drill engine 314 can identify all of the NFs and their respective types and identities (NF IDs), NF instances of each NF and their respective identifiers (instance IDs) within the specified cloud computing region or sub-region or local zone. For example, referring to FIG. 2A, if the network operator specifies cloud computing region 210-a, cloud platform drill engine 214 can identify all instances of the NFs that are executed within cloud computing region 210-a in NDC 202 or one or more RDCs 204 within the NDC 202. If the network operator specifies one or more cloud computing sub-regions (e.g., AZ 220-a1 and AZ 220-a2), cloud platform drill engine 214 can identify all instances of the NFs that are executed within the one or more cloud computing sub-regions in RDCs 204 within the NDC 202. If the network operator specifies one or more cloud computing local zones (e.g., LZ 230-a1 and LZ 230-a2), cloud platform drill engine 214 can identify all instances of the NFs that are executed within the one or more local zones in BEDCs 206 within the corresponding RDC 204. Further, cloud platform drill engine 314 can identify all of the pods that function as part of the identified instances of the NFs.

As noted, the network operator may specify the type of NF at which the monitoring process is to be performed. For example, the network operator may specify that the NF monitoring process should be set at instances of SBCs within NDC 202. In some embodiments, the network operator may have the option to further specify a particular RDC 204 within which the NF monitoring process is to be implemented. The network function statues query generation engine 316 may generate, in response to a request by the network operator through the user interface 322, a group query by issuing commands to the NFs and/or pods of the NFs. As mentioned above, the group query may target all NFs executed on the NDC 202 across all cloud computing regions, or alternatively, NFs executed on selected cloud computing regions 210 or selected cloud computing sub-regions 220 or selected local zones 230. In some embodiments, a group query for status of the NFs may be transmitted to the 5G network 200C through the network interface 312, and an NF status check function may be initiated in response to the group query. A corresponding NF status check function file may be generated. The group query may be customized to meet specific needs of the network operator. The commands issued by the network function statues query generation engine 316 may be specific to the vendor that provides the NF and, possibly, the version of the NF.

In some embodiments, the status of a NF includes various information regarding, among other things, the type of the NF (e.g., AMF, SMF, UPF, etc.), the registration status, the NF vendor information, the instance IDs of the NF instances, the region ID of the region where the NF is deployed, the sub-region ID (e.g., the AZ ID on AWS platform) of the sub-region wherein the NF is deployed, and/or the LZ ID of the local zone where the NF is deployed. In some embodiments, the status of the NF further includes the operational states of the NF, including but not limited to activity, standby, initializing or bootstrapping, suspended, unavailable or failed, maintenance or update, decommissioned, etc. In some embodiments, the status of the NF further includes the health status of the NF, including but not limited to healthy, degraded, warning, critical, unknown, etc. The real-time registration status, operational states, and health status of the NFs may be obtainable by accessing one or more of the followings: Network Management Server (NMS) 332, orchestration platform 138, Service Orchestration Function (SOF) 334, NF monitoring agents (NFMA) 336, etc. These components may be included in the 5G network 200C and accessible by the cloud platform drill 314 via the network interface 312.

For example, The NRF 257 may maintain information such as the addresses, capabilities, and characteristics of NFs and serve as a centralized lookup service that helps NFs locate and establish connections with each other based on their specific requirements. NMS 332 may be responsible for overall network management and monitoring. NMS 332 may collect data from various network elements and NFs, including their operational states and registration status. The orchestration platform 138 (FIG. 1A) may be responsible for automating the deployment, configuration, and management of NFs. The orchestration platform 138 interacts with the NFs to retrieve their operational states and registration status. The orchestration platform 138 also performs life-cycle management tasks, such as scaling, upgrading, and decommissioning NF instances. The SOF 334 coordinates the provisioning and orchestration of network services, which may involve multiple NFs. The SOF 334 may also collect information about the operational states and registration status of the NFs. The NFMAs 336 are typically virtual machines (VMs) or containers running on the same hypervisor or host as the NFs they monitor. The NFMAs 336 may be deployed alongside the NFs and continuously monitor their operational states and performance metrics. The NFMAs 336 may collect real-time data on the health, availability, and performance of the NFs in response to the group query sent from the network function statues query generation engine 316. The status data of the NFs may be generated in response to the group query and transmitted back to and received by the system 300 via the network interface 312.

The network function statues library 317 may be established to store status data of the NFs. The status data may include reference data (e.g., default registration status and intended operational states) of each NF of the network. The reference data may be pre-established and customized based on the information provided by the vendor or NF provider of the NF. The NF status check function files may also be stored in the network function statues library 317. These NF status check function files may be customized by performing the NF monitoring process. Each NF status check function file may specify one or more specific NF monitoring commands that are used to check the status of all NFs of the network, a selected plurality of NFs, a specific vendor's NF, and/or pods of the NF (and, possibly, for a specific version of the NF). In some embodiments, the NF status check function file may be retrieved from the network function statues library 317. For example, a NF status check function file may be stored for SWFs from vendor A and a separate NF status check function file may be stored in the network function statues library 317 for vendor B. In some embodiments, the NF status data received by the system 300 may also be stored to a file (i.e., an NF status data file) for later analysis or output in real-time for analysis by output analysis engine 318.

The cloud platform drill engine 314 and the network function status query generation engine 316 may operate in a conjunctive manner to synthesize the identifier information about the one or more NFs and/or the NFs' pods along with the commands from the NF status check file corresponding to the NF(s), for which the monitoring process is to be performed, such as NF type, registration status or ID, vendor ID, instance ID, region ID, sub-region ID, local zone ID, and/or version identifiers. Commands may be issued to the correct NF instances (and/or pods of the NF) being executed on the cloud computing platform.

In some embodiments, the NF status output raw data transmitted back from the NFs and/or pods in response to the group query by the network function statues query generation engine 316 are received by the system 300. The NF status output raw data may then be formalized, analyzed, processed, filtered to generate NF status data. The NF status data corresponding to each NF can be presented to the network operator for review via user interface 322.

Output analysis engine 318 can take the NF status data and condense the data in a user-friendly manner for presentation via user interface 322. In some embodiments, an NF status output is generated that summarize the real-time NF status information based on the NF status data.

FIG. 4 is a schematic diagram illustrating an example of the NF status output 400 (hereinafter "output 400") according to various embodiments. In the illustrated example, the output 400 includes a heading line 401 and multiple data lines 403 in a table format. However, other formats of the output 400 are also possible in alternative embodiments. Each one of the heading line 401 and data lines 403 further includes multiple data elements (entries or cells). The heading line 401 may include multiple headings corresponding to various status information of NFs. For example, heading 402 corresponds to the NF type, heading 404 corresponds to registration status, heading 406 corresponds to NF vendor or provider (vendor ID), heading 408 corresponds to instance ID, heading 410 corresponds to region ID (e.g., primary locality ID), heading 412 corresponds to sub-region ID (e.g., availability zone ID, second locality ID, etc.). Other NF status information, such as NF service status, NF capacity, NF load factor, etc., may also be included in the heading line 401 of the output 400. In some embodiments, the heading line 401 further includes a heading 414 corresponding to the reference (default) status of the NF. The reference status may be retrieved from the network function statues library 317. In some embodiments, the heading line 401 further includes a heading 416 corresponding to a flag indicator of the NF. The flag indicator is used to indicate presence or absence of an anomaly of the NF.

Each of the data lines 403 corresponds to one NF and includes multiple data elements, and each data element includes status data corresponding the NF. As an example, the real-time status data corresponding to the NF type may be AMF, SMF, AUSF, UDM, UDR, SMSF, BSF, PCF, CHF, EIR (Equipment Identity Register), etc. The real-time status data corresponding to the registration status may be registered or unregistered. The real-time status data corresponding to NF vendor may be a vendor ID assigned to the NF, such as vendor 1, vendor 2, vendor 3, etc. The real-time status data corresponding to instance ID may be a unique instance ID assigned to the NF. The real-time status data corresponding to region ID may be a region ID of the region to which the NF is assigned. The real-time status data corresponding to sub-region ID may be a sub-region ID of the sub-region (e.g., AZ) to which the NF is assigned. Other real-time status data may also be included in the output 400.

As mentioned above, reference status data corresponding to the NF may also be retrieved from the network function statues library 317 and presented in the output 400 in each data line 403. A comparison between the real-time status data and the reference data with respect to each NF may be performed. If a match is identified, the NF status may be labeled as "normal," or no flag is indicated. On the other hand, if a mismatch is identified, the NF status may be flagged, presenting a warning/alarm to the network operator. For example, if the real-time status data of an NF indicates that the region ID of the NF is "1," but the reference status data indicates that the region ID of the NF should be "2," a mismatch is identified, and the NF status will be flagged to reflect an anomaly. Likewise, if the real-time status data of the registration status indicates that the NF is "unregistered," but the reference status data indicates that the registration status of the NF should be "registered," a mismatch is identified, and the NF status will be flagged to reflect an anomaly. A network operator is notified by the flag and may in response take remedial action. The NF status output 400 that summarizes the status information of all or selected NFs provides a consolidated view of the overall health and performance of the NFs within the network, enabling the network operators to quickly assess the network's operational state and take appropriate actions. Compared with individually checking the status of each NF, network operators can get an overview of the entire network's health in one place. The summarized status output also enables network operators to detect patterns or trends across multiple NFs. The network operators can identify common issues, recurring errors, or performance degradations that may be affecting multiple NFs simultaneously.

Figure 5:
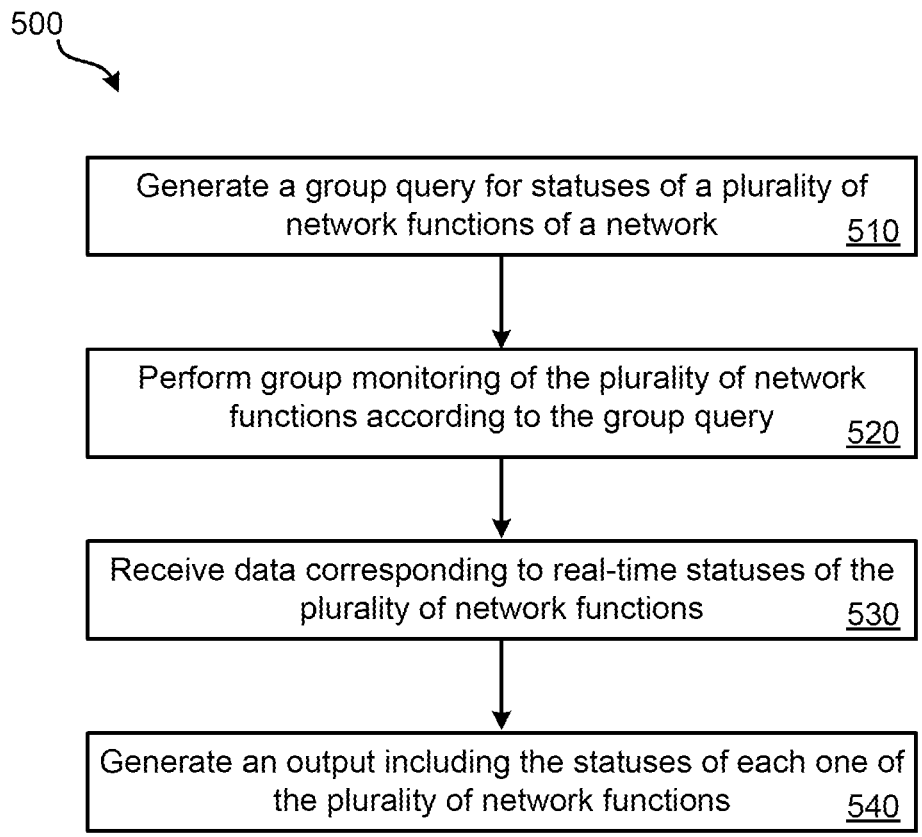
FIG. 5 is a flow diagram illustrating an example method for monitoring network function status according to various embodiments.

Various methods may be performed using the systems and arrangements detailed in relation to FIGS. 1A-4. FIG. 5 is a flow diagram illustrating an example method 500 for monitoring network function status according to various embodiments. Method 500 can be performed using the network function status monitoring and management system 300 of FIG. 3. Method 500 may be performed on a cloud computing platform that also executes the core functionality of a 5G network directly or by a computer system in communication with the cloud computing system that executes the core functionality of the 5G cellular network. Additional operations may also be included in method 500.

At 510, a group query for statuses of a plurality of network functions of a network is generated. In some embodiments, the network is a cellular network or a 5G core cellular network deployed on a cloud computing platform. In some embodiments, the plurality of network functions includes all network functions executed on network across multiple regions on the cloud computing platforms. In some embodiments, the method 500 includes identifying a region, a sub-region, or a local zone of the cloud computing platform and selecting network functions executed in the identified region or sub-region or local zone. As mentioned above, a sub-region may be an availability zone (e.g., AZ of AWS platform) within a particular region, and a local zone may be a portion within a sub-region of the cloud computing platform. In some embodiments, a group query file or an NF status check function file is generated, and the group query file or the NF status check function file may include, among other things, (1) the target region(s), target sub-region(s), and/or target local zone(s), and (2) commands for monitoring statuses of NFs executed in the target region(s), target sub-region(s), and/or target local zone(s).

At 520, a process for group monitoring of the plurality of network functions is performed. The group monitoring may be performed in response to the commands included in a group query file or the NF status check function file. The group monitoring process may be performed/executed by transmitting the commands included in the group query file or the NF status check function file to the network through the network interface. An interface protocol may be used to communicate with the 5G network and/or the management system thereof. Common interface protocols used in 5G networks include but are not limited to RESTful APIs, SNMP (Simple Network Management Protocol), NETCONF (Network Configuration Protocol), or other proprietary interfaces specific to the network operator.

At 530, in response to the query commands, data (e.g., output raw data) corresponding to real-time status of each one of the plurality of network functions may be generated, e.g., by various components of the network. The data may be received, formalized, processed, filtered, and analyzed to generate NF status data for each one of the network functions. As mentioned above, output raw data of NF status may be collected from various network components such as NRF, NMS, orchestration platform, SOF, NFMA, etc. The raw data may include registration statuses, operational states, health states, performance metrics, logs, flags/alarms, and other relevant information.

At 540, an output including the statuses of each one of the plurality of network functions is generated and presented to the network operator. In some embodiments, the output may be organized in a structured and organized manner to provide a comprehensive view of the network function statuses. In some embodiments, the NF status output can be organized in a tabular format (e.g., the format of FIG. 4), where each data line represents a network function and each data column represents a specific attribute or status parameter. In some embodiments, the NF status output can be further organized by the network function types, the regions, the sub-regions, and/or the local zones. In some embodiments, a dashboard format may be used to display the NF status output in a visual and intuitive manner. Various charts, graphs, and widgets can be employed to represent different aspects of the network function statuses. In some embodiments, color-coded indicators may be used to visually represent the NF status. For example, green may indicate a healthy status, yellow may represent a warning or cautionary state, and red may indicate a critical or problematic state. In addition to the organized presentation of NF status, flags/alarms/alerts/notifications may be generated based on pre-determined thresholds or rules. Alarms can be categorized based on severity levels and can provide additional details or recommended actions for troubleshooting. In some embodiments, a record of historical NF status data may be used for trend analysis and long-term monitoring. Historical logs and reports can be generated to track the performance, changes, and incidents related to network function statuses over time.

Figure 6:
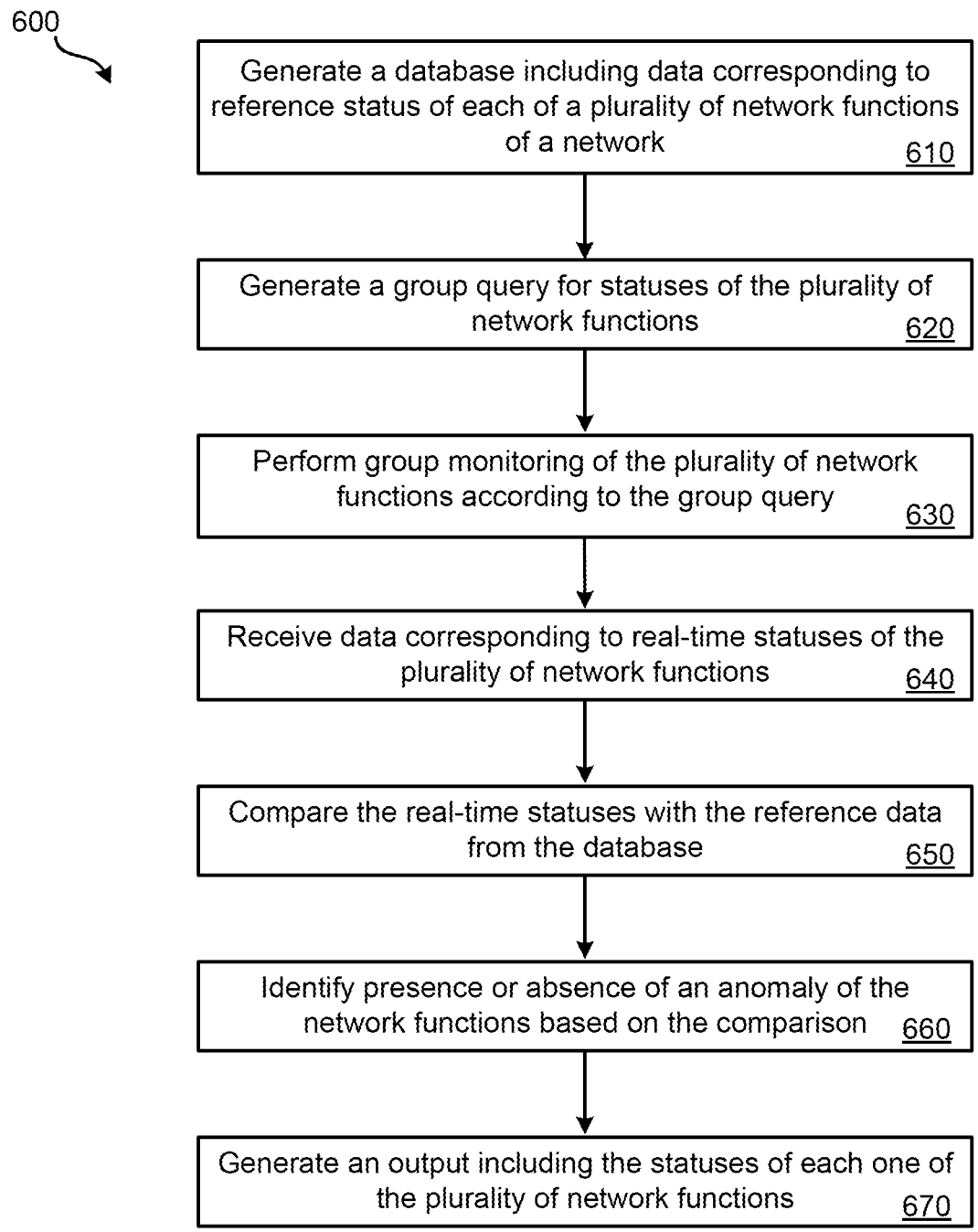
FIG. 6 is a flow diagram illustrating another example method for monitoring network function status according to various embodiments.

FIG. 6 is a flow diagram illustrating an example method 600 for monitoring network function status according to various embodiments. Method 600 is a close variation of the method 500 of FIG. 5 and may include any operations included therein. Additional operations may also be included in method 600.

At 610, a database (e.g., network function statuses library 317 of FIG. 3) is generated. The database includes data corresponding to reference status of each one of a plurality of network functions of a network. The database may serve as a reference point and store data/information about the expected or desired status/states of each one of the network functions executed on the network. The reference status data can include various parameters, metrics, or indicators that define the optimal functioning or operational state of the network functions. The database may be populated with predefined or predetermined reference status values for each network function based on established standards, known best practices, or specific requirements of the network. The reference status values may serve as a baseline against which the real-time status of the network functions is compared. The database may include other information related to the network functions.

At 620, a group query for statuses of a plurality of network functions of the network is generated, in a similar manner as operation 510 of method 500. At 630, a process for group monitoring of the plurality of network functions is performed according to the group query, in a similar manner as operation 520 of method 500. At 640, in response to the query commands, data (e.g., output raw data) corresponding to real-time status of each one of the plurality of network functions may be generated and received, in a similar manner as operation 530 of method 500.

At 650, the real-time statuses are compared with the reference statuses respectively for the plurality of network functions. The reference statuses may be retrieved from the database. At 660, presence or absence of an anomaly of the network functions is identified/determined based on the comparison. As mentioned above, by comparing the real-time statuses with the reference statuses, determinations can be made on if any mismatch/discrepancy/deviation exists. If the real-time status matches or closely aligns with the reference status, it indicates that the network function is operating within the expected parameters. However, if there are differences between the real-time and reference statuses, it may indicate a potential issue or anomaly that requires attention. By continuously comparing the real-time statuses with the reference statuses, network operators can proactively monitor the network functions and ensure their proper functioning and optimal performance within the network.

At 670, an output including the statuses of each one of the plurality of network functions is generated and presented to the network operator. The output may include the real-time status data as well as the relevant reference status for each network function. The output may further include a flag indicator indicating if the network function is flagged.

Figure 7:
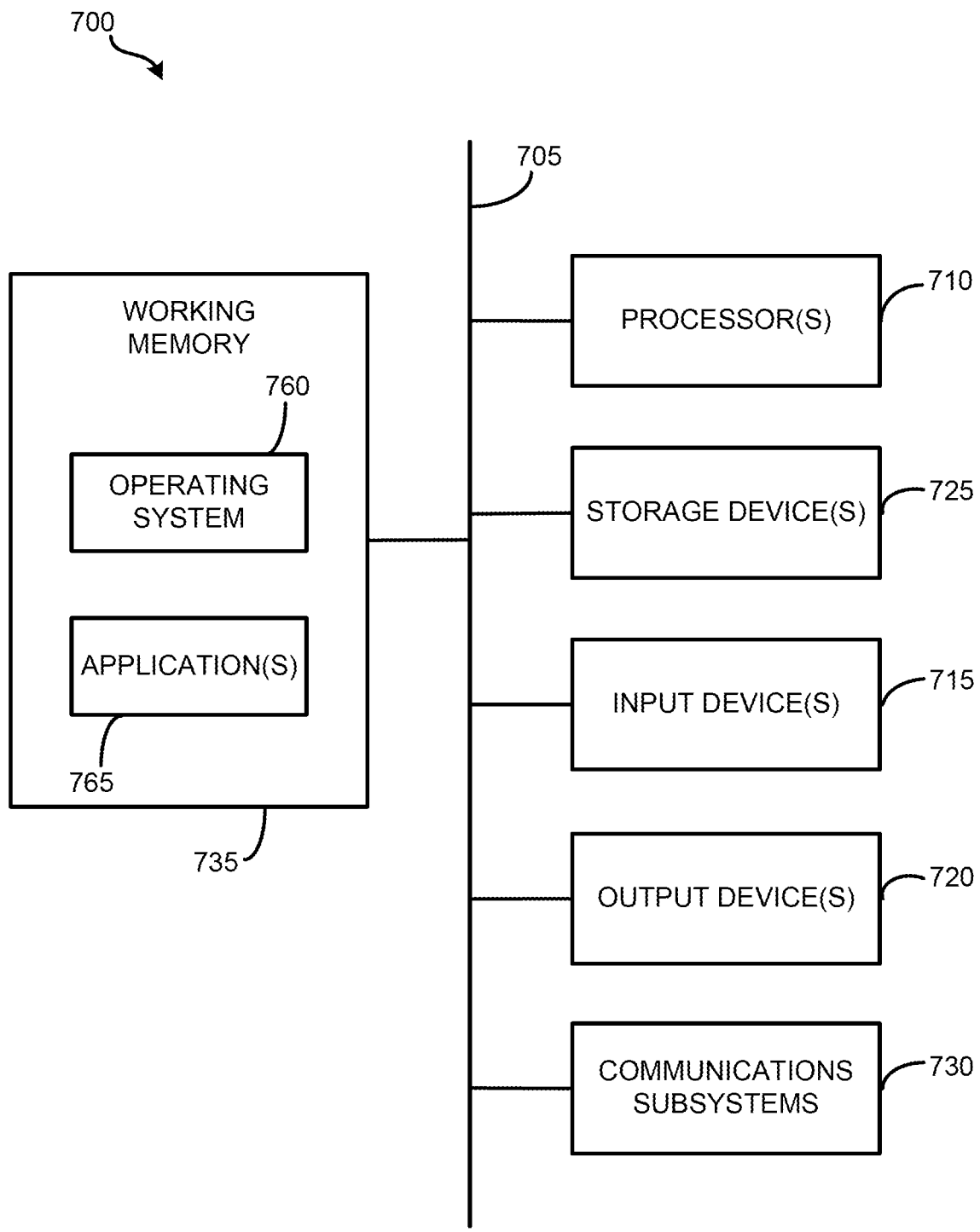
FIG. 7 is a schematic diagram illustrating an example computer system or computer device according to various embodiments.

FIG. 7 is a schematic diagram illustrating an example of computer system 700. The computer system 700 is a simplified computer system that can be used to implement various embodiments described and illustrated herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method, comprising:
generating a group query for a plurality of network functions of a network, the group query including commands for checking real-time status of each one of the network functions, wherein,
the network is a Fifth Generation (5G) network deployed on a cloud computing platform and comprises a national data center, a plurality of regional data centers, and a plurality of breakout edge data centers;
the cloud computing platform comprises a plurality of cloud computing regions, each cloud computing region further comprises a plurality of cloud computing sub-regions, and each cloud computing sub-region further comprises a plurality of local zones; and
the national data center is established across the plurality of cloud computing regions, the plurality of regional data centers are respectively established on the plurality of cloud computing regions, and the plurality of breakout edge data centers are respectively established on the plurality of local zones;
in response to the commands, performing group monitoring of the plurality of network functions to check the real-time status of each one of the plurality of network functions according to the group query;
receiving data corresponding to real-time status of each network function;
comparing the data corresponding to real-time status with the data corresponding to reference status for each one of the plurality of network functions;
identifying presence or absence of an anomaly of each one of the plurality of network functions, based on the comparison; and
generating a network function status output, the network function status output including data corresponding to the real-time status and an indication of the presence or absence of an anomaly for each one of the plurality of network functions.

2. The method of claim 1, wherein the plurality of network functions comprises all network functions executed on the national data center across the plurality of cloud computing regions.

3. The method of claim 1, further comprising:
identifying one or more cloud computing regions of the plurality of cloud computing regions,
wherein the plurality of network functions are network functions executed on the regional data center corresponding to each one of the identified one or more cloud computing regions.

4. The method of claim 3, further comprising:
identifying one or more cloud computing sub-regions of each one of the identified one or more cloud computing regions,
wherein the plurality of network functions are network functions executed on the regional data center in the identified one or more cloud computing sub-regions.

5. The method of claim 4, further comprising:
identifying one or more local zones of each one of the identified one or more cloud computing sub-regions,
wherein the plurality of network functions are network functions executed on the breakout edge data center in the identified one or more local zones.

6. The method of claim 1, further comprising:
establishing a database, the database comprising the data corresponding to reference status of each network function executed on the network.

7. The method of claim 1, wherein the network function status output further includes the data corresponding to the reference status of each network function.

8. The method of claim 1, wherein the status of the network function includes a registration status of the network function, a vendor identifier assigned to the network function, an operational state of the network function, and a health state of the network function.

9. The method of claim 8, wherein the status of the network function further includes a region identifier of the cloud computing region in which the network function is executed, a sub-region identifier of the cloud computing sub-region in which the network function is executed, and a local zone identifier of the local zone in which the network function is executed.

10. The method of claim 1, wherein the network function comprises at least one of:
an Access and Mobility Management function (AMF);
a Session Management Function (SMF); and
a User Plane Function (UPF).

11. A system comprising:
one or more processors; and
a computer-readable storage media storing computer-executable instructions that, when executed by the one or more processors, cause the system to:
generate a group query for a plurality of network functions of a network, the group query including commands for checking real-time status of each one of the network functions, wherein,
the network is a Fifth Generation (5G) network deployed on a cloud computing platform and comprises a national data center, a plurality of regional data centers, and a plurality of breakout edge data centers;
the cloud computing platform comprises a plurality of cloud computing regions, each cloud computing region further comprises a plurality of cloud computing sub-regions, and each cloud computing sub-region further comprises a plurality of local zones; and
the national data center is established across the plurality of cloud computing regions, the plurality of regional data centers are respectively established on the plurality of cloud computing regions, and the plurality of breakout edge data centers are respectively established on the plurality of local zones;

in response to the commands, perform group monitoring of the plurality of network functions to check the real-time status of each one of the plurality of network functions according to the group query;

receive data corresponding to real-time status of each network function;

compare the data corresponding to real-time status with the data corresponding to reference status for each one of the plurality of network functions;

identify presence or absence of an anomaly of each one of the plurality of network functions, based on the comparison; and generate a network function status output, the network function status output including data corresponding to the real-time status and an indication of the presence or absence of an anomaly for each one of the plurality of network functions.

12. The system of claim 11, wherein the plurality of network functions comprises all network functions executed on the national data center across the plurality of cloud computing regions.

13. The system of claim 11, wherein the instructions when executed by the one or more processors further cause the system to:

identify one or more cloud computing regions of the plurality of cloud computing regions, wherein the plurality of network functions are network functions executed on the regional data center corresponding to each one of the identified one or more cloud computing regions.

14. The system of claim 13, wherein the instructions when executed by the one or more processors further cause the system to:

identify one or more cloud computing sub-regions of each one of the identified one or more cloud computing regions, wherein the plurality of network functions are network functions executed on the regional data center in the identified one or more cloud computing sub-regions.

15. The system of claim 14, wherein the instructions when executed by the one or more processors further cause the system to:

identify one or more local zones of each one of the identified one or more cloud computing sub-regions, wherein the plurality of network functions are network functions executed on the breakout edge data center in the identified one or more local zones.

16. The system of claim 11, wherein the instructions when executed by the one or more processors further cause the system to:

establish a database, the database comprising the data corresponding to reference status of each network function executed on the network.

17. The system of claim 11, wherein the network function status output further includes the data corresponding to the reference status of each network function.

18. The system of claim 11, wherein the status of the network function includes a registration status of the network function, a vendor identifier assigned to the network function, an operational state of the network function, and a health state of the network function.

19. The system of claim 11, wherein the status of the network function further includes a region identifier of the cloud computing region in which the network function is executed, a sub-region identifier of the cloud computing sub-region in which the network function is executed, and a local zone identifier of the local zone in which the network function is executed.

20. The system of claim 11, wherein the network function comprises at least one of:

an Access and Mobility Management function (AMF);
a Session Management Function (SMF); and
a User Plane Function (UPF).

* * * * *